May 21, 1935.　　　　　　A. KUMM　　　　　　2,001,844
FISHING BAIT
Filed July 31, 1933
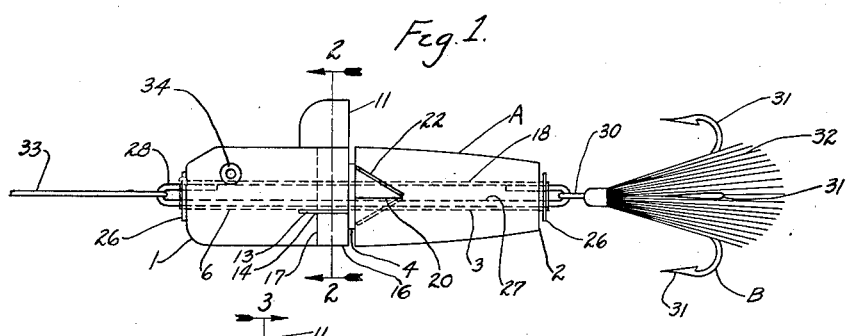
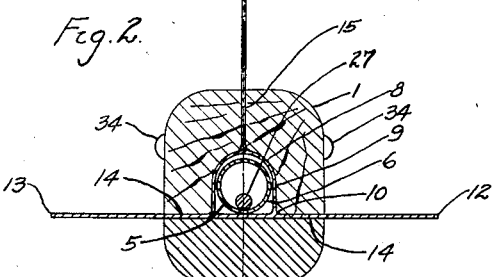
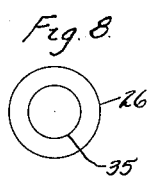
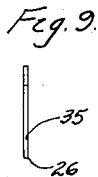
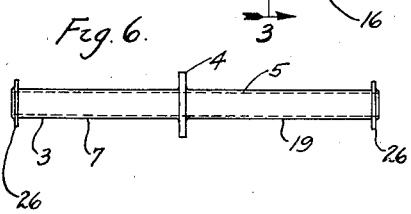
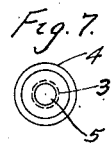
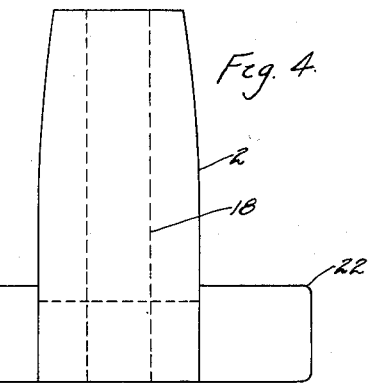
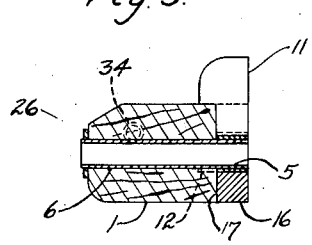
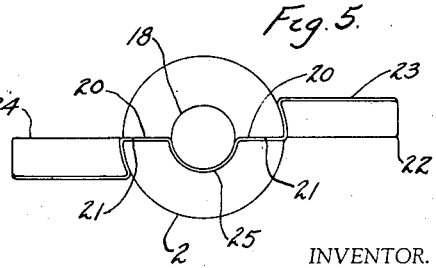
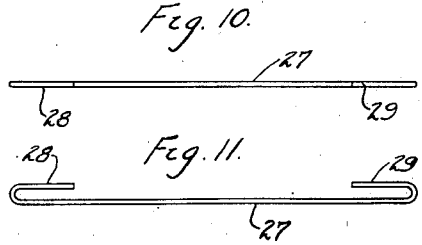
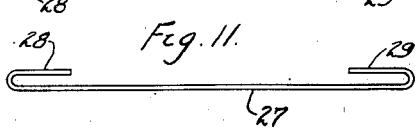
INVENTOR.
Arthur Kumm,
BY
George B. Ingersoll
ATTORNEY.

Patented May 21, 1935

2,001,844

UNITED STATES PATENT OFFICE 2,001,844

FISHING BAIT

Arthur Kumm, Dearborn, Mich.

Application July 31, 1933, Serial No. 682,898

12 Claims. (Cl. 43—47)

My invention relates to improvements in a fishing bait; and the objects of my improvement are, first, to provide a fishing bait having head and tail portions independently and revolvably mounted; second, to provide a fishing bait having a revolvably mounted head portion adapted to always position itself uprightly in the water; third, to provide a fishing bait portion having stabilizing or ballast means; fourth, to provide a fishing bait having a revolving portion operated by a propeller; fifth, to provide a fishing bait having body portions adapted to receive and position pressed fin or propeller members therein; and sixth, to provide a fishing bait having a shaft portion adapted for the securement of fishing hooks and a fishing line thereto and also adapted to revolvably support spaced bait portions thereon.

I attain these objects by the mechanism illustrated in the accompanying drawing, in which,—

Figure 1 is a plan view of the fishing bait assembly; Fig. 2, an enlarged vertical section of the front body portion and its fin and ballast member taken on the line 2—2, Fig. 1; Fig. 3, a sectional view of the front body portion taken on the line 3—3, Fig. 2; Fig. 4, a plan view of the rear body portion and its propeller member assembled therein; Fig. 5, an end view of the rear body portion and its propeller member assembled therein; Fig. 6, a plan view of the spindle or shaft member for supporting the body members; Fig. 7, an end view of the spindle or body member as disclosed in Fig. 6; Fig. 8, an enlarged end view of one of the washers for retaining the body portions on the spindle or shaft member; Fig. 9, a side view of the washer as disclosed in Fig. 8, Fig. 10, a plan view of the clip member for attaching the fishing line and fishing hooks; and Fig. 11, a side view of the clip member disclosed in Fig. 10.

Similar numerals refer to similar parts throughout the several views.

My fishing bait assembly A as disclosed in Figure 1 comprises the front body portion 1 and the rear body portion 2 which are shaped to resemble the outline of a small fish or similar object used as fishing lure.

The spindle, shaft, or tubular member 3 is provided with the shoulder or flange portion 4 at or adjacent its central portion, and is further provided with the passage or hole 5 extending throughout its length. The front body portion 1 is provided with a hole or passage 6 therethrough, the hole 6 forming a bearing on the journal portion 7 of the spindle 3 to permit the front body portion 1 to be revolvably mounted on said journal portion 7. The front body portion 1 is further provided with the recess 8 which may have a semicircular shape at its upper side to receive the housing portion 9 of the fin and ballast member 10. The fin and ballast member 10 comprises the upright or vertically extending flange 11 together with the transversely or horizontally extending flange members 12 and 13. The flange members 12 and 13 extend and fit within the slots 14 which extend transversely through the front body portion 1, the flanges 12 and 13 being extended on opposite sides of the front body portion 1, the flanges 12 and 13 being suitably connected to the housing portion 9 which is further joined to the upright flange 11 which in turn extends outwardly from the upper side of the front body portion 1 and engages and fits within the slot 15. The fin and ballast member 10 is further provided with the boss portion 16 which is located and suitably secured at the lower side of the flanges 12 and 13, the boss portion 16 being located at the center of the body portion 1 and is constructed of a shape conforming to the outline of the lower portion of the front body portion 1, the front body portion 1 being cut away as at 17 to permit the boss portion 16 to fit adjacent and be blended or conformed to the outline of the front body portion 1.

The rear body portion 2 is provided with the central hole or passage 18 which forms a bearing on the journal portion 19 of the spindle member 3. The front body portion 1 and the rear body portion 2 are adapted to engage and be spaced in their operative positions by the flange portion 4 of the spindle 3. The rear body portion 2 may be suitably tapered from its front to its rear end to conform to the general outline of a fish or similar object used as a bait and will be further provided with the slot 20 which extends therethrough and is adapted to receive the flat portions 21 of the propeller member 22 which is provided with the blade portions 23 and 24 which are formed integrally with the flat portions 21, the blade portions 23 and 24 being suitably formed or bent to provide the proper pitch for furnishing the proper thrust to revolve the rear body portion 2 on the journal portion 19 of the spindle 3 when the fishing bait assembly A is drawn through the water, the impact of the water exerting a thrust on the blade portions 23 and 24 to cause the rear body portion 2 and its propeller member 12 to continually revolve. The propeller member 22 will be provided with the offset portion 25 to permit the journal portion 19 of the spindle 3 to be assembled through the rear body portion 2 adjacent the offset portion 25 of the propeller member 22. The offset portion 25 and the flat portions 21 of the propeller member 22 may be of a lesser width than the width of the blade portions 23 and 24 to enable the slot 20 to be constructed with a lesser depth than would be otherwise if the flat portions 21 were the same width as the blade portions 23 and 24, thus conserving the depth of the slot 20 and the strength of the rear body portion 2.

It is to be noted that the rear body portion 2 and the front body portion 1 may be constructed of rubber composition, wood, light weight metal, or other similar material.

It is also to be noted that the propeller member 22 may, with its blade portions 23 and 24, be formed integrally of very light pressed steel of suitable color, and due to its light weight and integral construction will provide a very economical construction for such a unit of a fishing bait assembly.

It is also to be noted that the fin and ballast member 10 may be constructed of light weight pressed steel suitably secured together and to which the boss portion 16 may be suitably secured. As for instance if the boss portion 16 is constructed of heavy lead or similar heavy material to provide the proper ballast characteristics with a minimum amount of mass, the lead material can be soldered to the under side of the flanges 12 and 13.

After the front body portion 1 and the rear body portion 2 are assembled over the journal portions 7 and 19 respectively of the spindle member 3, one of the washers 26 may be assembled over the end of the spindle member 3 adjacent the end of the front end of the front body portion 1 as disclosed in Fig. 1, the washers 26 being provided with the openings 35 for fitting over the ends of the spindle 3.

The clip or hook member 27 can now be inserted through the hole 5 of the spindle member 3 so that the hook portion 28 of the clip member 27 may be adjacent the front end of the front body portion 1 and the hook portion 29 of the clip member 27 will be adjacent the rear end of the rear body portion 2.

The hook portions 28 and 29 will be of sufficient length to extend respectively within the holes 6 and 18 of the front and rear body portions 1 and 2. After the clip member 27 is assembled as above disclosed, a second washer 26 may be assembled over the end of the hook portion 29 of the clip member 27, the hook assembly B however being assembled within the hook portion 29 shaft before the washer 26 is assembled thereon, the hook assembly B being provided with the loop portion 30 for engaging the hook portion 29 of the clip member 27.

The hook assembly B may be provided with a plurality of hooks 31 to which may be suitably secured the hackles or similar fishing lure objects 32. After the spindle member 27 together with the hook assembly B and the washers 26 have been assembled in place, as disclosed in Figure 1, the washers 26 may be suitably secured to the ends of the spindle member 3 as by soldering or by similar means, to provide integral assembly of the washers 26 and the spindle 3 as disclosed in Figure 6.

The fishing line 33 may be suitably secured through the eye portion formed by the hook portion 28 and the clip member 27, as disclosed in Figure 1.

It is to be noted that the front and rear body portions 1 and 2 are now revolvably mounted on the spindle member 3 and will be operatively spaced longitudinally at their adjacent central portions by the flange 4 of the spindle member 3 and will be retained at their outer ends by the washers 26.

As the fishing bait assembly A is pulled through the water by the line 33, the rear body portion 2 will be impelled to rotate by the thrust of the water against the blade portions 23 and 24, and the front body portion 1 will revolve or oscillate on the journal portion 7 of the spindle member 3 sufficiently at all times to allow the weighted or ballast portion formed by the boss 16 to hold the front body portion 1 upright in the water, this upright position being further maintained by the flanges or fins 11, 12 and 13 which due to the thrust of the water will also tend to maintain the front body portion 1 in an upright position, the front body tending to revolve or oscillate as the conditions require to enable it to remain in an upright position.

The front body portion 1 may be provided with the eyes 34 to further cause it to resemble a fish or similar object used as a fishing bait. Also the front and rear body portions 1 and 2 may be provided with colored designs and figures to increase its resemblance to the desired object represented by the fishing bait assembly A.

I claim:

1. In a fishing bait adapted to be drawn through water, the combination of a spindle member provided with a pair of spaced journal portions together with a passage extending therethrough, a body member movably mounted on one of the spaced journal portions of said spindle member, said body member being provided with a recess and slots extending from the recess to the outside of said body member, a ballast member provided with a portion extending within the recess of said body member together with fin members extending within the slots of said body member, said ballast member together with its fins tending to always maintain said body member in an upright position in the water, a second body member revolvably mounted on the other of said journal portions of said spindle member, said second body member being provided with slots, a propeller mounted in the slots of said second body member and adapted to revolvably operate said second body member when drawn through the water, a clip member extending through the passage of said spindle member, and hook members suitably connected to one end of said clip member, the other end of said clip member adapted to be connected to a draft member.

2. In a fishing bait adapted to be drawn through water, the combination of a spindle member, a body member movably mounted on said spindle member, a stabilizing member provided with fins and suitably attached to said body member, said stabilizing member being provided with a housing portion extending around said spindle member, and a mass of material having a higher specific gravity than said body member, said mass being suitably connected with said stabilizing member, said mass being adapted to further stabilize said body member in an upright position when being drawn through the water.

3. In a fishing bait adapted to be drawn through water, the combination of a spindle, a pair of revolvably mounted members on said spindle, said spindle being provided with a flange for spacing said pair of revolvably mounted members from each other, means for maintaining one of said pairs of revolvably mounted members in an upright position when being drawn through the water, and means for revolving the other of said pair of revolvably mounted members when being drawn through the water.

4. In a fishing bait, the combination of a hollow spindle member, a pair of body members movably mounted and spaced from one another on said spindle member, washer members for retaining said body members on said spindle member, said washer members being suitably connected with said spindle member, a clip member extending within said hollow spindle member, said clip member being provided with hook portions at each of its ends, one of said hook portions being adapted to receive a draft member, and fish hook members connected with the other of the hook portions of said clip member.

5. In a fishing bait adapted to be drawn through water, the combination of a body member provided with a ballast member for maintaining said body member in an upright position in the water, a second body member provided with a propeller for revolving said second body member when being drawn through the water, a spindle member for supporting and retaining said body members thereon, said spindle member being provided with a spacing flange extending between said body members adjacent said ballast member and said propeller, a clip member mounted in said spindle member, and fish hook members connected with said one end of said clip member and the other end of said clip member being adapted to receive a draft member.

6. In a fishing bait, the combination of a spindle member, body members movably mounted on said spindle member, a clip member extending through said spindle member, said clip member having its ends folded adjacent itself to form hook portions extending within said spindle member, and fish hooks connected with one of the hook portions of said clip member, and the other of said hook portions of said clip member being adapted to receive a draft member.

7. In a fishing bait adapted to be drawn through the water, the combination of a spindle, a body member movably supported on said spindle, a second member provided with fins and mounted on said body member, said second member being fixed against movement relative to said body member, and a ballast member solely supported by said second member and cooperating with said second member to always maintain said body member in an upright position when being drawn through the water.

8. In a fishing bait adapted to be drawn through water by draft means, the combination of a spindle, a body member rotatably mounted on said spindle, a fin member extending transversely through said body member and adapted to maintain said body member from rotating, said spindle member extending through said fin member, a clip member extending through said spindle member and connected with the draft means, and hook means connected with said clip member.

9. In a fishing bait adapted to be drawn through the water, the combination of a spindle, a pair of body members movably supported on said spindle, means located between and spacing said pair of body members, and means for maintaining one of said pair of body members in an upright position when the fishing bait is drawn through the water, said last mentioned means being supported on the inner end portion of one of said body members and adjacent said first mentioned means, said means comprising flanges located substantially at right angles to one another.

10. In a fishing bait, the combination of a body member provided with a longitudinal passage together with slots at one of its ends, said slots extending transversely from said longitudinal passage to the outer surfaces of said body member, a propeller member mounted in the slots of said body member, said propeller member being provided with an offset portion in the longitudinal passage of said body member, said propeller member being provided with blade portions extending from said body member, said blade portions being formed at their inner ends to fit the outside surfaces of said body member, a hollow spindle extending through said body member and adjacent the offset portion of said propeller member for supporting said body member in its operative position, and clip means extending through said hollow spindle for receiving a draft member and a fish hook.

11. In a fishing bait adapted to be drawn through water, the combination of a spindle, a body member movably mounted on said spindle, a second body member movably mounted on said spindle and provided with a portion having a higher specific gravity than the material of said second body member, and flange members cooperating with said second body member to maintain said second body member in an upright position when said body members are drawn through the water, said flange members being fixedly mounted on and relative to said second body member.

12. In a fishing bait adapted to be drawn through water, the combination of a spindle, a body member movably mounted on said spindle, a second body member fixed on the spindle and provided with a cut away portion, said second body member being provided with a portion having a higher specific gravity than the material of said member, said portion of the second body member fitting the cut away portion of and conforming to the general shape of said second body member, said second body member being provided with upright and horizontal flanges for cooperating with said portion of said second body member having said higher specific gravity to maintain said second body member in an upright position when said members are drawn through the water.

ARTHUR KUMM.